United States Patent [19]

Burgoon et al.

[11] 4,328,014
[45] May 4, 1982

[54] SWEEPER HOPPER WITH FILTER ASSEMBLY

[75] Inventors: Jack L. Burgoon; Christopher M. Knowlton, both of Toledo, Ohio

[73] Assignee: The Scott & Fetzer Company, Lakewood, Ohio

[21] Appl. No.: 256,526

[22] Filed: Apr. 22, 1981

[51] Int. Cl.³ .................. B01D 46/10; B01D 46/52; B01D 50/00
[52] U.S. Cl. .................................... 55/300; 15/352; 55/304; 55/319; 55/493; 55/502; 55/504; 55/509
[58] Field of Search ............. 55/300, 304, 319, 493, 55/504, 509, 502, 475; 15/349, 352, 347

[56] References Cited
U.S. PATENT DOCUMENTS

| | | | |
|---|---|---|---|
| 1,598,644 | 9/1926 | Greene | 55/300 |
| 2,784,440 | 3/1957 | Newport | 15/352 X |
| 3,484,889 | 12/1969 | McCandless | 15/352 X |
| 3,486,309 | 12/1969 | Wild | 15/352 X |
| 3,587,213 | 6/1971 | Tamny et al. | 55/304 X |
| 3,928,008 | 12/1975 | Petersen | 55/493 X |
| 4,002,443 | 1/1977 | Lorenz | 55/493 X |
| 4,258,451 | 3/1981 | Sommerfeld | 55/300 X |

Primary Examiner—Kathleen J. Prunner
Attorney, Agent, or Firm—Allen D. Gutchess, Jr.

[57] ABSTRACT

A sweeper hopper with a filter assembly is provided. The filter assembly separates the hopper into a dirt and debris-receiving chamber and an exhaust chamber. Airborne dirt carried through the dirt and debris chamber is trapped by the filter assembly and the air enters the exhaust chamber from which it is exhausted through a blower. A holding frame holds the filter in place against a supporting frame or flanges. The frame has a shaker motor which is periodically operated to clean the filter by vibration. When the filter is to be replaced, the holding frame is readily separable therefrom for rapid replacement, yet the holding frame securely holds the filter in place when the sweeper is in operation.

14 Claims, 6 Drawing Figures

SWEEPER HOPPER WITH FILTER ASSEMBLY

This invention relates to a sweeper hopper with an improved filter assembly.

The filter assembly according to the invention is usually employed in a hopper of a riding-type sweeper. The hopper is of the type having a dirt and debris-receiving chamber with an inlet opening which receives the dirt and debris from a main rotary broom of the sweeper. The hopper also has an exhaust chamber which communicates with an exhaust blower to establish a flow of air through the inlet opening, the dirt and debris-receiving chamber, and the exhaust chamber. A filter assembly separates the two chambers with air-borne dirt carried with the air being trapped by the filter assembly as the air flows through. The filter assembly in accordance with the invention includes a holding frame which holds a filter in place against a supporting frame or flanges in the hopper. The holding frame has a shaker motor with an eccentric weight thereon which is periodically rotated to shake the holding frame and the filter, causing dirt collected therein to be separated therefrom and fall into the dirt and debris-receiving chamber. The holding frame is mounted in a manner so as to be readily separable from the filter to enable rapid replacement of the filter, when necessary.

It is, therefore, a principal object of the invention to provide a hopper for a riding-type sweeper with the hopper having an improved filter assembly therein.

Another object of the invention is to provide a filter assembly for a sweeper hopper, which assembly includes a holding frame for a filter which is readily separable from the filter.

Yet another object of the invention is to provide a filter assembly for a sweeper hopper, which assembly includes a readily-removable holding frame for holding a filter against a supporting frame and a shaker motor mounted on said holding frame.

Many other objects and advantages of the invention will be apparent from the following detailed description of preferred embodiments thereof, reference being made to the accompanying drawings, in which.

Figure 1:
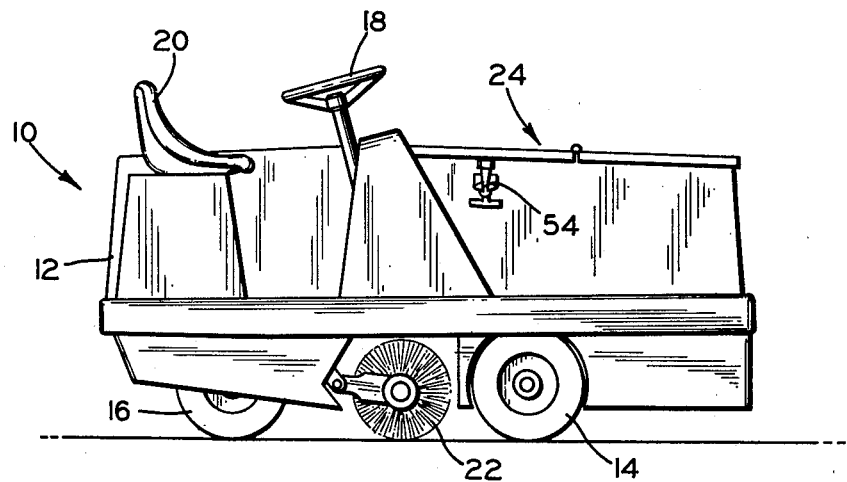
FIG. 1 is a somewhat schematic side view in elevation of a riding sweeper with a hopper embodying the invention.

Referring to FIG. 1, a riding power sweeper embodying the invention is indicated at 10. The machine includes a frame or body 12 with intermediate wheels 14 and a central, rear wheel 16 which is steered by a steering wheel 18 located in front of an operator's seat 20. A curb or side broom (not shown) can be located in front of the wheel 14, as is known in the art, and a main, rotary drum broom 22 is located between and immediately to the rear of the wheels 14.

A dirt and debris-receiving hopper 24 is located at a forward portion of the machine to receive dirt and debris from the drum broom 22. The hopper has a bottom 26 (FIG. 2), a rear wall 28, side walls 30, and a front wall 32. The rear wall 28 is contoured to fit with a partition extending across the machine in front of the operator's location. The wall 28 has a lower opening 34 to receive dirt and debris from the drum broom 22 with the periphery of this opening sealing with rubber flaps on a wall forming a plenum chamber around the main broom. The rear wall 28 also has an upper opening 36 which communicates with a vacuum blower 38 which establishes a flow of air and air-borne dirt through the inlet 34, through a dirt and debris chamber 40, through a filter assembly indicated at 42, and through an exhaust chamber 44. The filter assembly 42 divides the interior of the hopper 24 into the dirt and debris chamber 40 and the exhaust chamber 44.

The hopper 24 has a top 46 with a front section 48 over the dirt and debris chamber 40 and a rear section 50 over the exhaust chamber 44. The sections are connected by a hinge 52 and the rear section 50 is held down by at least one resilient latch 54 (FIG. 1) cooperating with a catch 56 (FIG. 3) on each of the hopper side walls 30.

A strengthening strut 58 extends across the hopper at an intermediate portion thereof near the top and is affixed to the side walls 30. The strut 58 includes an upper flange 60 (see FIG. 4 particularly), a supporting flange 62, and a connecting web 64. Side flanges 66 also are affixed to and extend outwardly from the side walls 30 of the hopper and a supporting flange 68 extends outwardly and upwardly at an angle from the rear wall 28. The four flanges 62, 66, and 68, along with an intermediate flange or strap 70 extending between central portions of the upper and lower flanges 62 and 68 constitute a supporting frame of the filter assembly 42.

Filter means is supported against the flanges 62, 66, 68, and 70. In this instance, the filter means constitutes two separate filters 72 each including rectangular frames 74 and filter media 76. The filter media includes pleated standard filter material backed up on the downstream or clean side by perforate metal screens. The filter frames 74 are sealed on the supporting frame by gasket strips 78.

Figure 3:
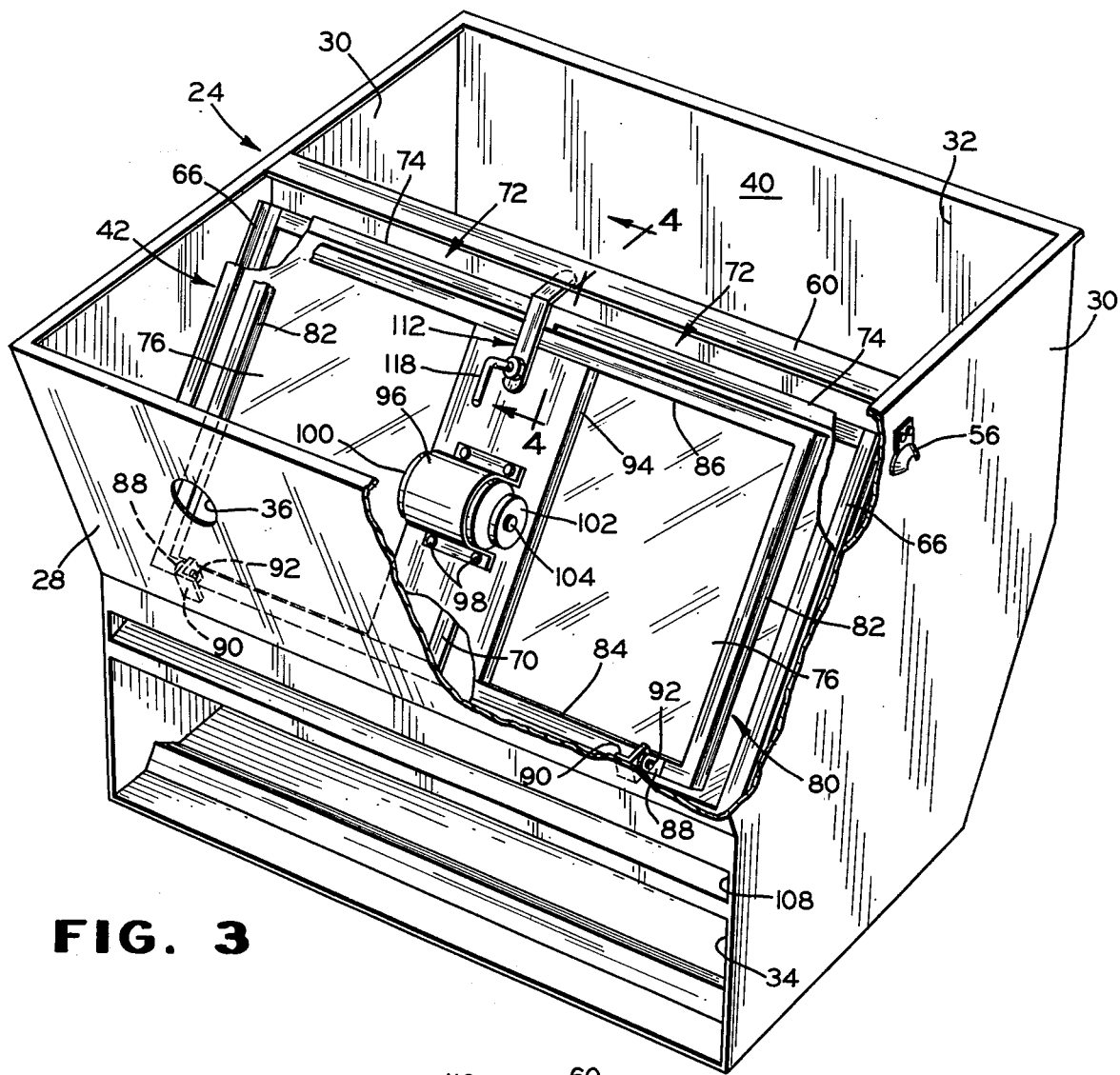
FIG. 3 is a view in perspective, with parts broken away, of the hopper and a filter assembly therein.
Figure 4:
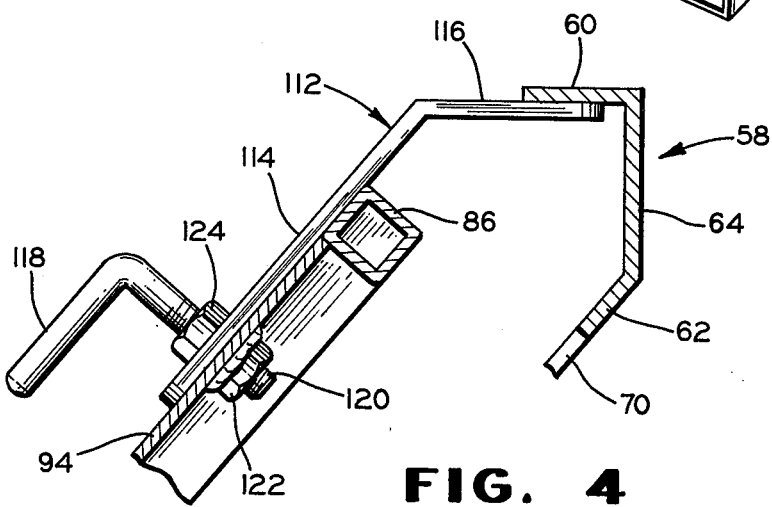
FIG. 4 is an enlarged view in transverse cross section taken along the line 4—4 of FIG. 3.

The filters 72 are held against the supporting flanges in the embodiment of FIGS. 3 and 4 by a holding frame 80 having side frame members 82, a lower longitudinal frame member 84, and an upper longitudinal frame member 86, all of square tubular construction, in this instance. The lower longitudinal frame member 84 has two spaced ears 88 affixed thereto and pivotally connected to brackets 90 by pins 92, the brackets being affixed, as by welding, to the rear hopper wall 28.

A combination holding and mounting plate 94 extends between intermediate portions of the longitudinal frame members 84 and 86 and aids in holding portions of the filter 72 in place, particularly against the intermediate strap 70. A mounting bracket 96 of generally semi-circular configuration is affixed to a central portion of the mounting plate 94 by fasteners 98. The bracket 96 securely holds an electric motor 100 against the mounting plate 94. An eccentric weight 102 is affixed to a drive shaft 104 of the motor 100 and shakes the motor 100, as well as the mounting plate 94 and the overall holding frame 80 when the drive shaft 104 is rotated. This causes dirt collected by the filter media 76 to fall out onto a collecting plate 106 in the hopper chamber 40.

Figure 2:
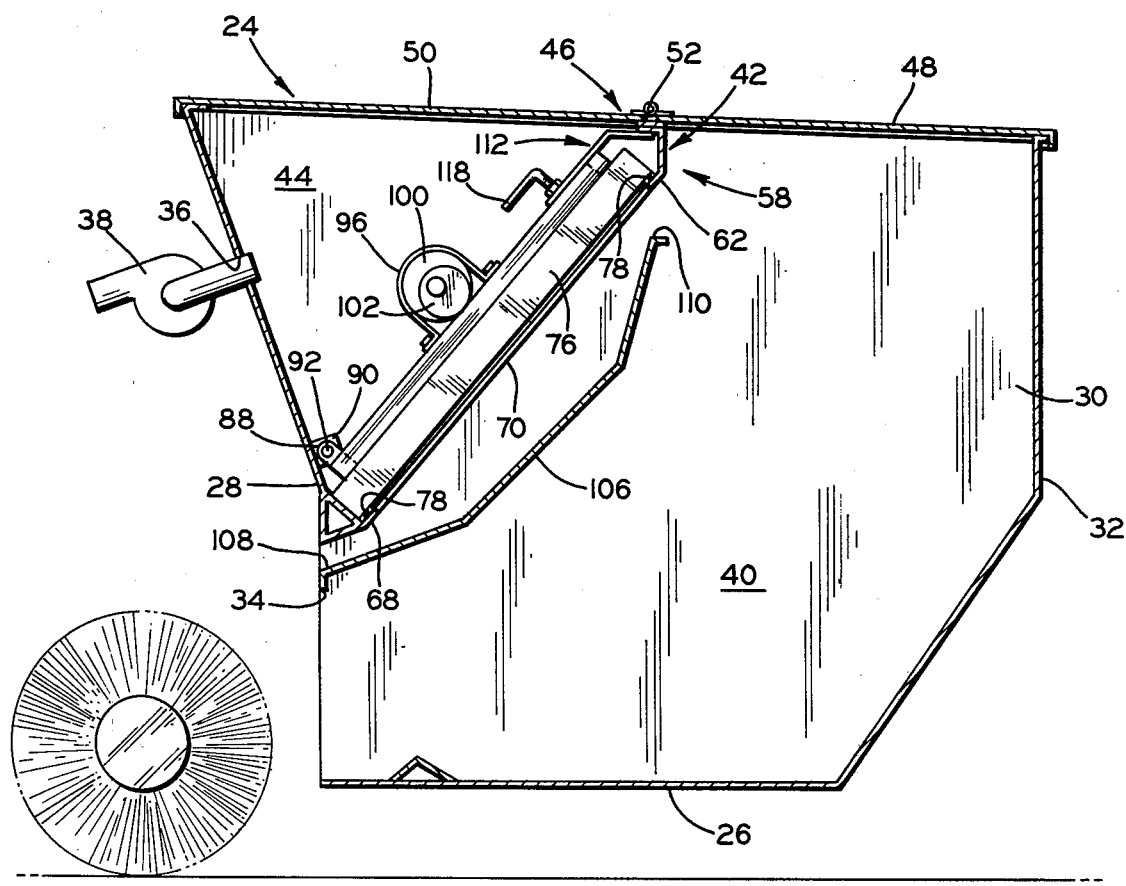
FIG. 2 is a side view of the hopper of FIG. 1 with a side wall deleted.

When the hopper 24 is emptied from a low dumping position, it is turned in a counterclockwise direction as viewed in FIG. 2 with dirt and debris in the chamber 40 emptying out the inlet opening 34 and with dirt collected on the plate 106 emptying out an elongate opening 108 in the rear wall 28 above the opening 34. When the hopper is designed to be emptied from a high dumping position, it is raised and turned in a clockwise direction with the chamber 40 emptied through the top with the top section 48 opening by gravity when the hopper is moved beyond an over-center position. At that time, the dirt collected on the plate 106 will also empty out through an upper opening 110 between the upper end of the plate 106 and the filter assembly 42, with the opening 108 in that instance being sealed off.

As dirt builds up in the filter media 76, the pressure differential across the filter 72 increases and a substantial amount of force is required on the holding frame 80 to maintain the filter 72 in sealing relationship with the supporting frame or flanges. At the same time, the holding frame 80 must be capable of being readily removable from the filters in order to replace them, as required from time to time.

In the embodiment of FIGS. 2-4, connecting means for holding the holding frame 80 against the filters comprises a latch member 112 having a main portion 114 and an upper, angular end portion 116. The lower end of the main portion 114 of the latch member 112 has a hole through which an L-shaped handle 118 having a threaded end 120 is received. The end 120 is turned into a nut 122 affixed, as by welding, to the back of the mounting plate 94. An upper nut 124 is threaded on an upper portion of the threaded end 120 of the handle 118 and turns with the handle 118. When the handle 118 is turned in a clockwise direction, as viewed in FIG. 3, the nut 124 firmly contacts the portion 114 of the latch 112 and firmly holds it in place, with the upper end 116 under the flange 60 of the strip 58. This provides ample force to hold the holding frame 80 against the filter 72 with the latch 112 being somewhat resilient and under stress. When the handle 118 is turned in a counterclockwise direction, the nut 124 moves with it and away from the latch portion 114. This provides sufficient play in the latch 112 to enable it to be swung out to the side and to move the end portion 116 away from under the flange 60. From a functional standpoint, the nut 124 can simply be a flange on the handle or a washer welded thereto, by way of example.

Thus, it will be seen that the holding frame 80 is securely held against the filters 72 even when they become clogged with dirt and yet the frame can be readily removable by swinging the latch 112 to the side and swinging the frame 80 back on the pins 92 near the inside surface of the rear wall 28 of the hopper 24. The filters 72 are then readily accessible and can be quickly replaced.

Figure 5:
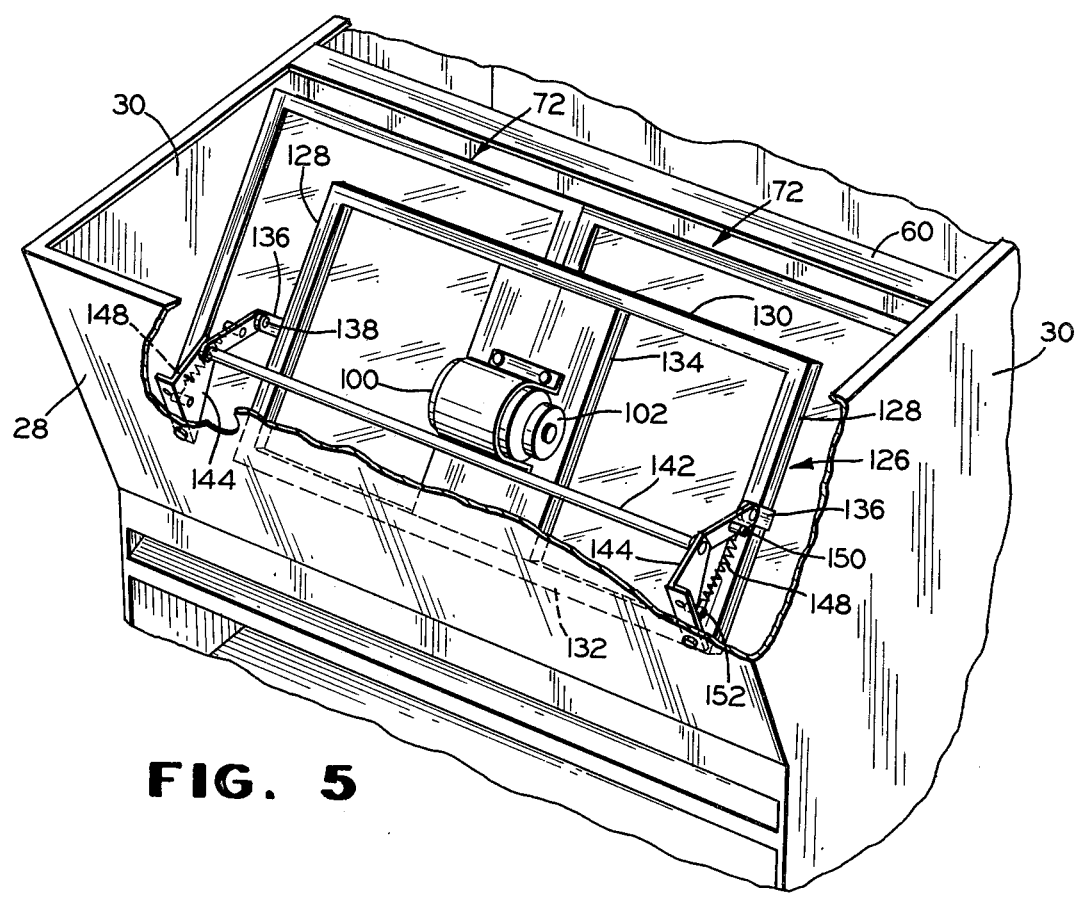
FIG. 5 is a view in perspective, with parts broken away of a modified filter assembly in accordance with the invention.
Figure 6:
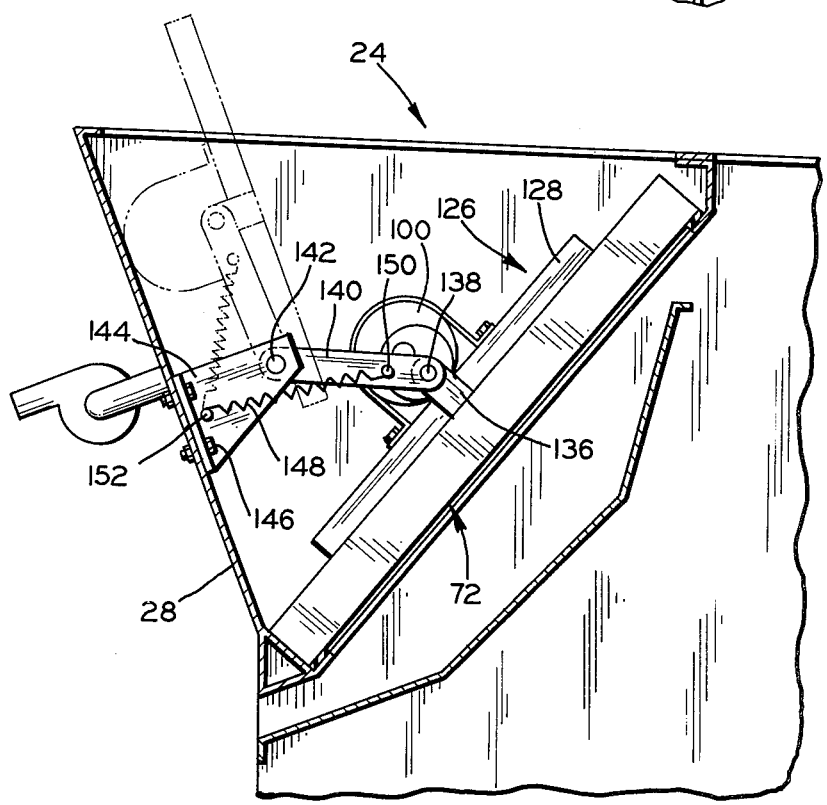
FIG. 6 is an end view of the filter assembly of FIG. 5 with the hopper side wall deleted, and showing certain components of the assembly in dotted lines in another position.

Referring now more particularly to FIGS. 5 and 6, modified connecting means for holding a holding frame against the filter means is provided. In this instance, a holding frame 126 is substantially the same as the holding frame 80 but is somewhat smaller, having shorter end frame members 128, shorter upper and lower longitudinal frame members 130 and 132, and a shorter mounting plate 134. Intermediate portions of the end frame members 128 have outwardly-extending ears 136 which are pivotally connected by pins 138 to ends of pivot links 140. The other ends of the pivot links 140 are connected by an elongate rod 142 which also extends through the pivot links and has the ends supported by brackets 144. The brackets 144 are suitably affixed to the rear wall 28 of the hopper 24 as by fasteners 146.

Over-center, coil springs 148 are connected between the pivot links 140 and the brackets 144, as by projecting pins 150 and 152 which are positioned so that the springs are located below the rod 142 when the holding frame 126 is in contact with the filters 72. Tension on the springs 148 thus urges the holding frame 126 further in a clockwise direction, as viewed in FIG. 6, to urge the frame 126 tightly against the filters.

When the filters 72 are to be removed and replaced, the frame 126 is swung to an upper dotted line position near the rear wall 28, as viewed in FIG. 6, to provide ready accessibility to the filters 72. At this time, the coil spring 148 is located above the elongate rod 142 and thereby urges the holding frame in a counterclockwise direction away from the filters.

Thus, again, the connecting means of FIGS. 5 and 6 enables the filters to be tightly held against the supporting frame or flanges and yet to be readily moved to an out-of-the-way position for accessibility to the filters.

Various modifications of the above described embodiments of the invention will be apparent to those skilled in the art and it is to be understood that such modifications can be made without departing from the scope of the invention, if they are within the spirit and the tenor of the accompanying claims.

We claim:

1. A dirt and debris-receiving hopper for a sweeper comprising a front wall, a bottom wall, side walls, a rear wall, and a top forming a hopper chamber, filter assembly means extending across said chamber and forming a dirt and debris-receiving chamber and an exhaust chamber at an upper rear portion of said hopper chamber, said filter assembly means comprising a supporting frame including side flanges extending inwardly from the hopper side walls, a lower flange extending inwardly from the hopper rear wall, and an upper flange extending downwardly from the hopper top, at least one filter having edge gaskets seated on the sides of said flanges facing toward said top and said rear wall, a rectangular holding frame, means pivotally supporting said holding frame relative to said rear wall, means connected to said holding frame for holding said holding frame against the filter when said holding frame is in contact with the filter, a shaker motor having a drive shaft, an eccentric weight mounted on said drive shaft, and means connecting said shaker motor to an intermediate portion of said holding frame on the side thereof opposite the filter.

2. A hopper according to claim 1 characterized by said pivotally supporting means pivoting a lower edge portion of said holding frame to said hopper rear wall.

3. A hopper according to claim 2 characterized by said means connected to said holding frame comprising a latch member cooperating with a flange of said hopper at the upper edge of said holding frame.

4. A hopper according to claim 3 characterized by said latch member comprising a resilient elongate member having one end portion cooperating with said flange at the upper edge of said holding frame, and means pivotally connecting another end portion of said resilient member to an upper portion of said holding frame.

5. A hopper according to claim 1 characterized by said means connected to said holding frame comprising a spring connected between an intermediate portion of said holding frame and the rear wall of said hopper.

6. A filter assembly for a dirt and debris-receiving hopper of a sweeper, with the hopper having a front wall, a bottom wall, side walls, a rear wall, and a top forming a hopper chamber, said filter assembly extending across the hopper chamber and dividing the hopper chamber into a dirt and debris-receiving chamber and an exhaust chamber at an upper portion of said hopper chamber, said side walls of said hopper having side flanges extending inwardly, said rear wall of said hopper having a lower flange extending inwardly, said hopper top having an upper flange extending downwardly, said filter assembly comprising at least one filter seated on upper surfaces of said flanges facing toward said top and said rear wall, a holding frame of a size smaller than the overall size of the filter, means for pivotally mounting said holding frame relative to said rear wall, means connected to said holding frame for holding said frame against the filter when said holding frame is in contact with the filter, a shaker motor having a drive shaft, an eccentric weight mounted on said drive shaft, and means connecting said shaker motor to an intermediate portion of said holding frame on the side thereof opposite the filter.

7. A filter assembly according to claim 6 characterized by said pivotally mounting means pivoting a lower edge portion of said holding frame to said hopper rear wall.

8. A filter assembly according to claim 6 characterized by said means connected to said holding frame comprising a latch member cooperating with a flange of said hopper near the upper edge of said holding frame.

9. A filter assembly according to claim 8 characterized by said latch member comprising a resilient elongate member having one end portion cooperating with the last-named flange and having another end portion pivotally connected to an upper portion of said holding frame.

10. A filter assembly according to claim 9 characterized by said pivotal connection including means adjustable to vary the tightness of the pivotal connection between said latch member and said holding frame.

11. A dirt and debris-receiving hopper for a sweeper comprising wall means forming a hopper chamber, a filter assembly extending across said chamber and forming a dirt and debris-receiving chamber and an exhaust chamber therein, said filter assembly comprising a filter supporting frame, at least one filter seated on said frame, a holding frame, means supporting said holding frame relative to said wall means of said hopper to enable movement of said holding frame between a position in contact with the filter and a position out of the way of the filter, means engageable with said holding frame for holding said holding frame against the filter when said holding frame is in contact with the filter, and means for shaking said holding frame.

12. A hopper according to claim 11 characterized by said supporting means pivoting a lower edge portion of said holding frame to the hopper wall means.

13. A hopper according to claim 12 characterized by said means engageable with said holding frame comprising a latch member pivotally mounted on an upper edge portion of said holding frame opposite said supporting means, said latch member having means cooperating with means associated with said supporting frame for holding said holding frame against the filter.

14. A hopper according to claim 11 characterized by said means engageable with said holding frame comprising links pivotally connected to intermediate end portions of said holding frame, and springs connected between the links of said holding frame and the wall means of said hopper.

* * * * *